D. F. Mellen,
Shaving Wood Screws,
Nº 53,647. Patented Apr. 3, 1866.
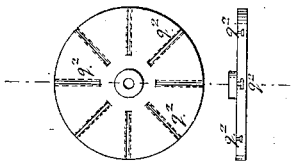
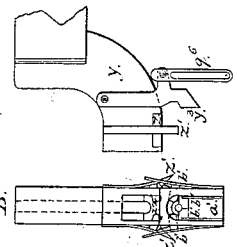
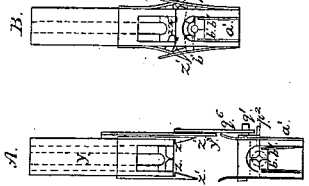
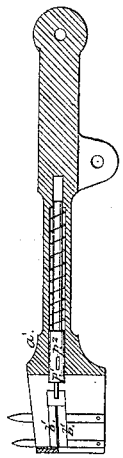
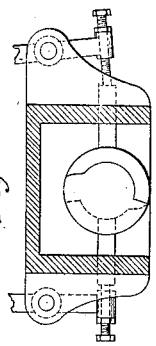
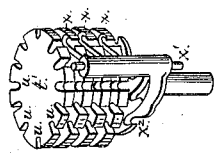
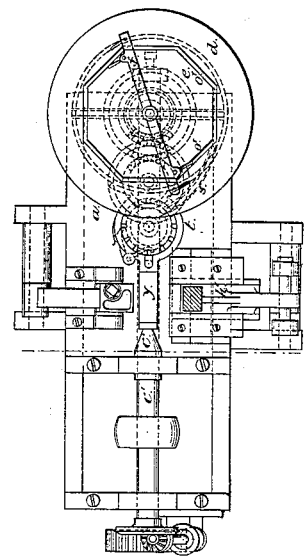
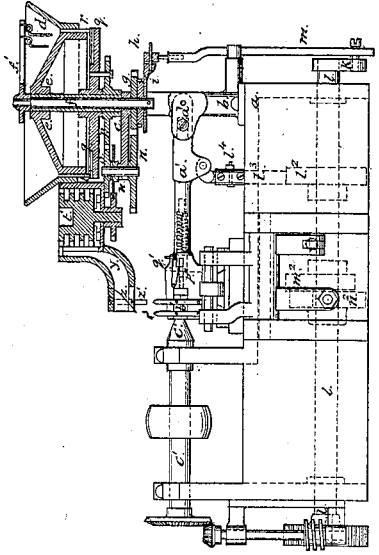
Witnesses:
Inventor:
Dustin F. Mellen

UNITED STATES PATENT OFFICE.

DUSTIN F. MELLEN, OF NEW YORK, N. Y.

IMPROVEMENT IN MACHINERY FOR SHAVING WOOD-SCREWS.

Specification forming part of Letters Patent No. 53,647, dated April 3, 1866; antedated March 14, 1866.

*To all whom it may concern:*

Be it known that I, D. F. MELLEN, of the city, county, and State of New York, have invented certain new and useful Improvements in Screw Machinery for Shaving the Heads of Screws, a part of which apparatus is applicable in machines for the other processes of making screws; and I do hereby declare the following to be a full, clear, and exact description thereof, referring to the accompanying drawings, in which—

Figure 1 is a vertical section through the feeding-hopper and a side elevation of other parts of the machinery for shaving heads of screw-blanks, one of a series of machines and parts of machines which I have devised for completing metal wood-screws, for all of which I am about to apply for Letters Patent. Fig. 2 is a plan of the machine; Fig. 3, the feed-cylinder detached; Fig. 4, parts of the feed apparatus detached.

In the machine about to be described there are parts which, either with or without modification, are common to others of my series of machines necessary to make a screw, among which is the feed apparatus, &c., and this feed apparatus may be used in other screw machinery than that devised by me and in other places where such a feed is required.

The construction of the mechanism is as follows: On a properly-formed base, $a$, a standard, $b$, is affixed, rising up and branching out so as to support a hopper, $d$, on a cross-frame, $c$, in a stationary position. A stout stud in the center of the cross-frame $c$ supports a center-piece in form of an obtuse cone, $e$, the base of which is cut into the form of a polygon, as shown in the plan, Fig. 2. Between the base of this cone and the hopper $d$ there is a space of equal width all around, the hopper being cut into a polygon of the same number of sides as the base of the cone and as much larger as will leave the space required between them, as clearly seen in Fig. 2. A center spindle, $f$, runs down through the center of the cone $e$ to a space in the standard-frame $b$ below the cross-frame $c$. In this space there is a gear-wheel, $g$, on the spindle $f$ and a ratchet-wheel, $h$, by which said spindle $f$ is turned by means of a pawl on a vibrating arm, $i$, actuated by a crank, $k$, on the end of the cam-shaft $l$ through a lever, $m$, connected with the crank $k$ by a pin working into a slot in said lever. The gear-wheel $g$ above named gears into another somewhat larger in diameter at $n$ on the lower end of a short axle, on the upper end of which is a pinion, $o$, gearing into a feed-wheel, $p$, that is centered and turns on the standard that supports cone $e$ with a disk, $q$, to which it is affixed. This disk $q$ has a number of radial grooves, $q^2$, in its upper face, (see Fig. 6,) in which are certain slide-pieces, from which project upward pins $r$. (See Fig. 1.) These pins $r$ extend up into the polygonal space around the base of the cone $e$ and sweep around in it as the disk revolves, sliding out and in, the slides moving out and in so as to conform to the polygonal track the pins $r$ move in. To the upper end of the spindle $f$ a cross-bar, $f'$, is affixed, which extends across the diameter of the hopper, having on its ends spring hooks or claws.

A channel or spout, $s$, (shown by dotted lines in Fig. 2,) extends from one of the angles of the hopper to a horizontal cylinder, $t$. The sides of this spout rise upward so as to form a double incline toward the polygon and the cylinder $t$, which cylinder $t$ forms a stationary case for a revolving cylinder, $t'$, which is turned to fit it. This cylinder $t'$ is shown in the plan, Fig. 2, and detached in Fig. 3. There are holes $u$ drilled in cylinder $t'$ all around the circle, large enough to hold a screw-blank, and the space between these holes and the periphery is cut out so as to form a recess, $u$. This cylinder has a stem at its center below, that extends down through the bottom of the stationary cylindrical case $t$. This stem has a toothed wheel, $v$, thereon, by which it is revolved. This revolution is effected by certain cogs or arms $w$ on the axle just beneath the pinion $o$, placed at sufficient distances to strike the teeth on wheel $v$ and move it at proper intervals, each movement bringing one of the recesses $u$ opposite the spout $s$, where it receives a screw-blank. Around the periphery of the cylinder $t'$ there are a number of grooves cut, in which fingers $x$ lie. These fingers are centered at $x'$, and have a spring at $x^2$, that acts upon an arm projecting from the axis to throw the fingers outward. The ends of these fingers are opposite to the opening into the directing-spout $y$, hereinafter more particularly described, that conveys the screw-blanks to the feeding-forceps.

The operation of this part of the machine is as follows: The screw-blanks, after being cut and headed, are thrown promiscuously into the hopper $d$, where they are stirred up by the arm $f'$ and spring-claws above named, the inner and outer inclined planes serving to direct them toward the polygonal space before named, the straight sides of which space aid and facilitate the screw-blanks to fall down into the space all around. The heads being larger than the space, the blanks are supported thereby. The pins $r$, as they sweep around through the space, convey the screw-blanks forward until they arrive at the spout $s$, which they enter, and are driven forward by succeeding blanks until they reach one of the recesses $u$ in the cylinder $t'$, in which they are conveyed opposite to the directing-spout $y$, into which they are thrown by the fingers $x$.

It is obvious that the number of screw-blanks that will at all times fall into the polygonal space will far exceed the number required to supply the machine, and it will be noticed that when the spout $s$ is filled there is no impediment to the passage of the superabundant blanks past that point around in the space or channel in the hopper. By this means I insure with absolute certainty, under all ordinary contingencies, a constant supply of screws to the machine.

So far as hereinbefore described this apparatus is applicable to any screw machinery requiring a feed, and may be applied to machinery for other purposes where such a feed is needed.

The directing-spout $y$ in the machine under consideration is concave on its upper side, curving down to a horizontal line, and causes the screw-blank to fall point foremost into a horizontal position directly over a pair of dies or jaws, $z$, in the lower end of the tube $y$. These jaws are more clearly shown in the end view, Fig. 4, (A.) They consist of two side pieces, $z\,z$, affixed to two springs, each on the side of spout $y$. They have inclined projections at $z'$ $z'$ below the bottom of the jaws. The springs hold the jaws together while receiving a blank, after which the feed-arm $a'$ comes up and strikes between the inclined faces of the projection $z'$ and opens the jaws so as to drop the screw-blank down into the opening in the head of the feed-arm $a'$.

In the position seen at Fig. 4, (B,) in the head of the feed-arm $a'$ are four jaws, $b$, forming when closed an inclosure around the screw-blank. The two upper ones are attached to springs that extend up high enough to be struck by the jaws $z'$ connected with the spout $y$, so that as they open, as above named, they open the upper pair of jaws $b'$ and allow the blank to fall through onto the lower pair of jaws $b'$, which are closed, as seen at Fig. 4, (B.) These lower jaws are affixed to springs, so that they can be pressed open. When the feed-arm $a'$ descends the upper jaw $b'$ and jaws $z$ are relieved and close, securing the screw-blank in the jaws $b'$ and preparing the jaws $z$ to receive another blank. The feed-arm drops quickly so as to bring the screw-blank into line with the axis of the horizontal spindle $c'$, in the end of which are jaws or forceps to receive the screw-blank and hold it. To prevent the recoil of this arm when it drops into place I insert near its fulcrum, in one of the stationary lugs or bearings between which the arm plays, a friction-plate, as shown by dotted lines in Fig. 1, set up with a screw, $a^7$. When the arm stops the blank is thrust forward into the spindle as follows: Within a recess in the arm $a'$, back of the head, there is a piston, $p'$, placed, which is seen at C, Fig. 4. This piston is forced back when the arm $a'$ rises to receive a blank from jaws $z$ by means of an inclined plate, $y$, (see Fig. 7,) affixed to the side of the spout $y$, which inclined plate is struck by a projecting stud, $p^2$, on said piston $p'$, bearing it back until its stud $p^2$ is caught and held by the latch $q'$. This latch, when arm $a'$ drops, is tripped by a link, $q^6$, connected with the vibrating end of the latch and suspended to spout $y$. (See Fig. 7.) As the arm $a'$ reaches its lowest point and is directly opposite the spindle, which frees the piston and its spring, driving it forward, forces the blank into the spindle, as before said. This device is applicable to my screw-threading machinery and is used by me therein.

The tool-holder $h'$ slides forward and back in the ways on the frame, that can be set nearer to or farther from the end of the spindle in the line of its axis to suit the length of the screw-blank. It receives its motion forward and back, in the act of shaving the head, from a lever arrangement whose fulcrum is the shaft $n'$, the lower arm of which comes into connection with a cam, $n^2$, on the cam-shaft $l$. (See Fig. 5.) The counter-rest $m'$ is pivoted so as to swing forward and hold the screw-blank firmly while being shaved. Its motion is received from cam $n^2$ on the cam-shaft. Cam $l^2$ raises the feed-arm $a'$ by means of an upright bar, $l^3$, the length of which is made adjustable by means of the wedge at $l^4$. It will be noticed that all the cams act directly on a rod or bar sliding radially to and from the cam-shaft, by which I insure accuracy of adjustment and movement.

Having thus fully described my improved screw machinery, what I claim therein, and desire to secure by Letters Patent, is—

1. The inclined hopper, having a channel of polygonal form at the base to receive the blanks from the hopper, as and for the purposes described.

2. The employment of pins $r$, working on sliding plates in the disk, Fig. 6, and sweeping around in the polygonal recess in the hopper to carry around the screws therein, substantially as described.

3. The cylinder $t'$, grooved as herein specified, and the fingers $x$ in combination therewith, as and for the purposes described.

4. The curved spout $y$ and spring-jaws $z$, for delivering the screw-blank to the feed-arm $a'$, as herein specified.

5. The feed-arm $a'$ and the apparatus connected therewith, for receiving the screw-blank from the jaws $z$ and delivering it to the spindle $c'$, constructed, arranged, and operated substantially as and for the purposes herein set forth.

6. The adjustable shaving apparatus, gaged and operated as herein specified.

7. The revolving cross-arm $f'$ and spring-claws, or their equivalent, for stirring up the screw-blanks in the hopper of the feed apparatus, for the purpose set forth.

DUSTIN F. MELLEN.

Witnesses:
J. J. GREENOUGH,
S. G. CLARKE.